(12) United States Patent
Puchegger

(10) Patent No.: US 6,770,818 B1
(45) Date of Patent: Aug. 3, 2004

(54) SEALED ELECTRICAL CABLE DUCT AND METHOD FOR PRODUCTION THEREOF

(75) Inventor: Karl Puchegger, Ternitz (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/381,400

(22) PCT Filed: Sep. 17, 2001

(86) PCT No.: PCT/EP01/10748

§ 371 (c)(1),
(2), (4) Date: Apr. 16, 2003

(87) PCT Pub. No.: WO02/24485

PCT Pub. Date: Mar. 28, 2002

(30) Foreign Application Priority Data

Sep. 22, 2000 (EP) ............................................. 00120778

(51) Int. Cl.⁷ ................................................. H02G 3/00
(52) U.S. Cl. ..................... 174/100; 174/65 G; 174/135; 174/99; 361/826; 439/470
(58) Field of Search .......................... 174/99, 100, 151, 174/50.61, 65 G, 65 SS, 76, 77 R, 50.56, 135; 361/826; 439/470

(56) References Cited

U.S. PATENT DOCUMENTS

| 5,380,955 A | 1/1995 | Argyrakis et al. ........... 174/151 |
| 5,491,300 A | 2/1996 | Huppenthal et al. ........ 174/151 |
| 5,528,093 A | 6/1996 | Adam et al. ................... 310/89 |
| 6,239,370 B1 | 5/2001 | Loibl et al. ............... 174/65 R |

FOREIGN PATENT DOCUMENTS

| DE | 197 42 178 C1 | 4/1999 | ......... H02G/15/013 |
| EP | 0 513 263 B1 | 11/1992 | ......... H01R/13/533 |
| EP | 0 618 659 B1 | 10/1994 | ............ H02K/7/18 |
| WO | WO 99/52743 | 10/1999 | ........... B60R/16/02 |

*Primary Examiner*—Dhiru R Patel
(74) *Attorney, Agent, or Firm*—Cohen, Pontani, Lieberman & Pavane

(57) ABSTRACT

A housing with electronics arranged therein includes a wall defining a penetration therethrough. A flexible conductor support made of plastic and including electrical conductors embedded therein extends through the penetration opening for electrical connection of at least one of the conductors to the electronics in the housing. The plastic of the flexible conductor provides insulation of the electrical conductors. The conductor support is sealed and mechanically fixed by a conductor support seal arranged between the penetration opening of the housing and the conductor support, the conductor support seal being molded directly onto the flexible conductor support and the housing.

11 Claims, 2 Drawing Sheets

SEALED ELECTRICAL CABLE DUCT AND METHOD FOR PRODUCTION THEREOF

PRIORITY CLAIM

This is a U.S. national stage of application No. PCT/EP01/10748, filed on Sep. 17, 2001. Priority is claimed on that application and on the following application:

County: Europe, Application No.: 00120778.6, Filed: Sep. 22, 2000.

BACKGROUND OF THE INVENTION

1. Field of the Invention

The invention relates to a sealed electrical cable penetration and a method for production thereof.

2. Description of the Prior Art

In motor vehicles, it is increasingly required that control electronics, accommodated in a housing, such as, for example, gear motor drives for window lifts, sunroofs, or the like, be integrated with and connected to the engine and/or transmission, the control electronics mounted on a circuit carrier that is required to be shielded from the oils used in engines and transmissions, as these oils contain chemically extremely aggressive additives. At the same time, however, electrical conductors must penetrate the shielding to allow engine or transmission components to be controlled or supplied via the control electronics.

A connector system that is suitable for use in such conditions is known from European patent EP 0 513 263 B1. Here, a flexible film with electrical traces is led through between a closure support and a housing and establishes an electrical connection between a component inside the housing and a component outside the housing. To accomplish sealing between the flexible film and the closure part or the housing, the flexible film must be surrounded by a seal. The sealing of the closure part with respect to the housing and the film is relatively complex or cannot be safely guaranteed in all cases.

To simplify the manufacturing and assembly process, DE 197 42 178 C1 discloses how the conductor support can be introduced directly into the housing wall through which the traces are to be routed. However, this can cause problems due to excessively high thermal loading of the substrate material. Some of these problems can sometimes be circumvented by selecting an appropriately heat-resistant, but more cost-intensive material such as polyamide.

SUMMARY OF THE PRESENT INVENTION

This object can be achieved by a device for sealing an electrical cable penetration through the wall of a housing, wherein the housing has a wall defining a penetration opening therethrough, the device including a flexible conductor support made of plastic and including electrical conductors embedded therein, the plastic providing insulation of said electrical conductor. The flexible conductor support is inserted through the penetration opening and sealed and mechanically fixed therein by a conductor support seal. The conductor support seal is made from plastic and molded directly onto the flexible conductor support and the housing.

For the manufacture of the cable penetration according to the invention, the mass temperature of the sealing material can be kept lower than that of the previously injection-moldable housing and therefore an inexpensive material with lower temperature resistance, in particular a thermoplastic, can be selected. Furthermore, a high degree of leak-proofness between an opening-side housing edge and a housing cover to be placed thereupon can be ensured, as the interposed sealing layer exhibits a high degree of homogeneity over its entire sealing surface area because of the absence of the conductors encapsulated in their own separate penetration opening. The possibility of molding the conductor support and the seal or sealing layer in and on respectively in a single operation as well as the possibility of injection-molding the dimensionally complicated housing without simultaneously molding in the conductor support results in a significant and, particularly for automated production of a mass-produced article, advantageous reduction in manufacturing costs.

DETAILED DESCRIPTION OF THE PREFERRED EMBODIMENTS

Figure 1:
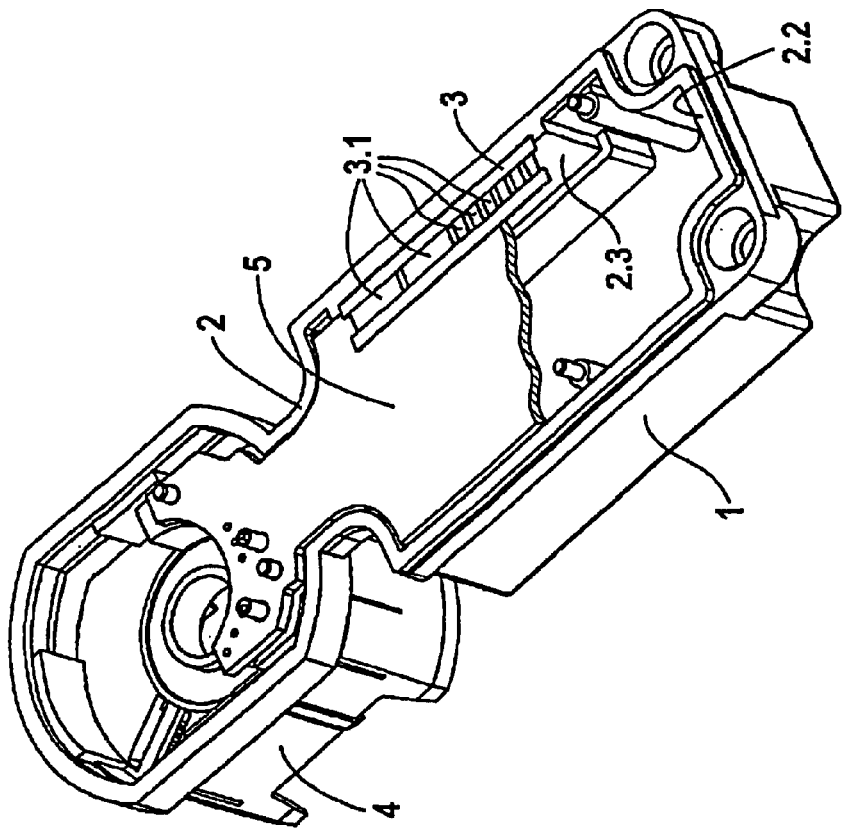
FIG. 1 is a perspective view of a pot-shaped electronics housing having a conductor support extending from its upward facing base area through a penetration opening and forming a seal.
Figure 2:
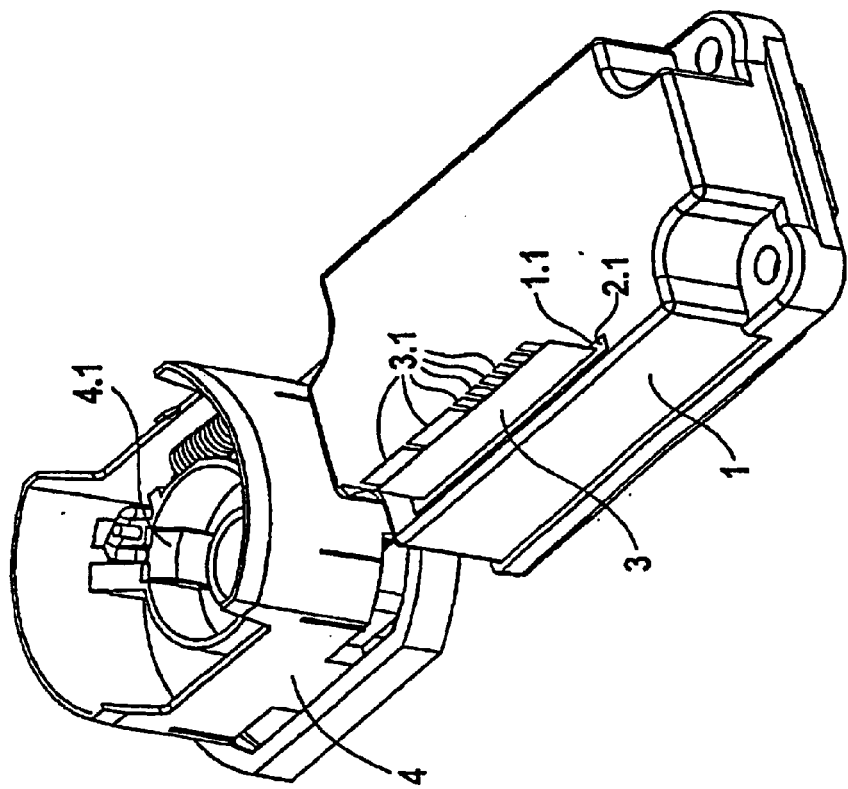
FIG. 2 is a perspective view of the pot-shaped electronics housing according to FIG. 1 with upward facing pot edge side with sealing layer for sealing with respect to a housing cover to be placed onto the leakproof closure.
Figure 4:
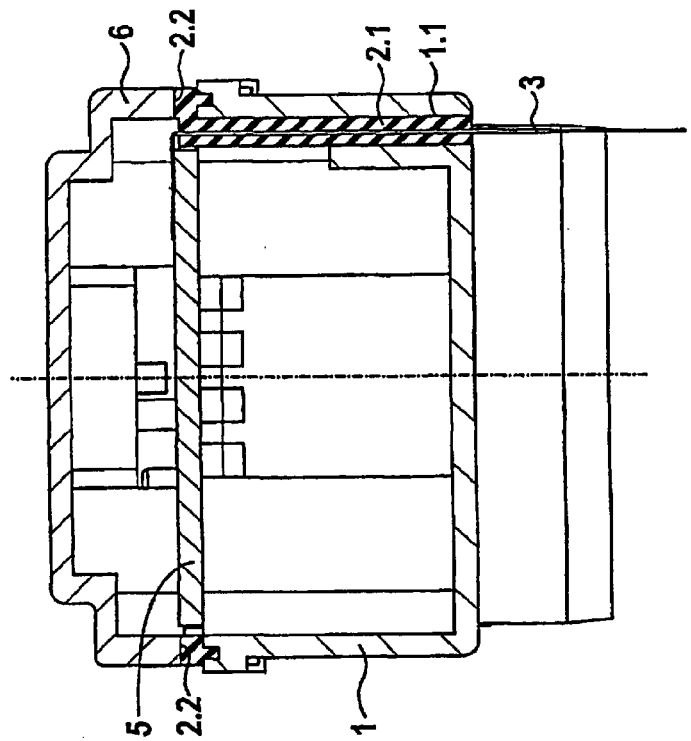
FIG. 4 is a sectional view of the electronics housing along intersection IV—IV in FIG. 3.
Figure 3:
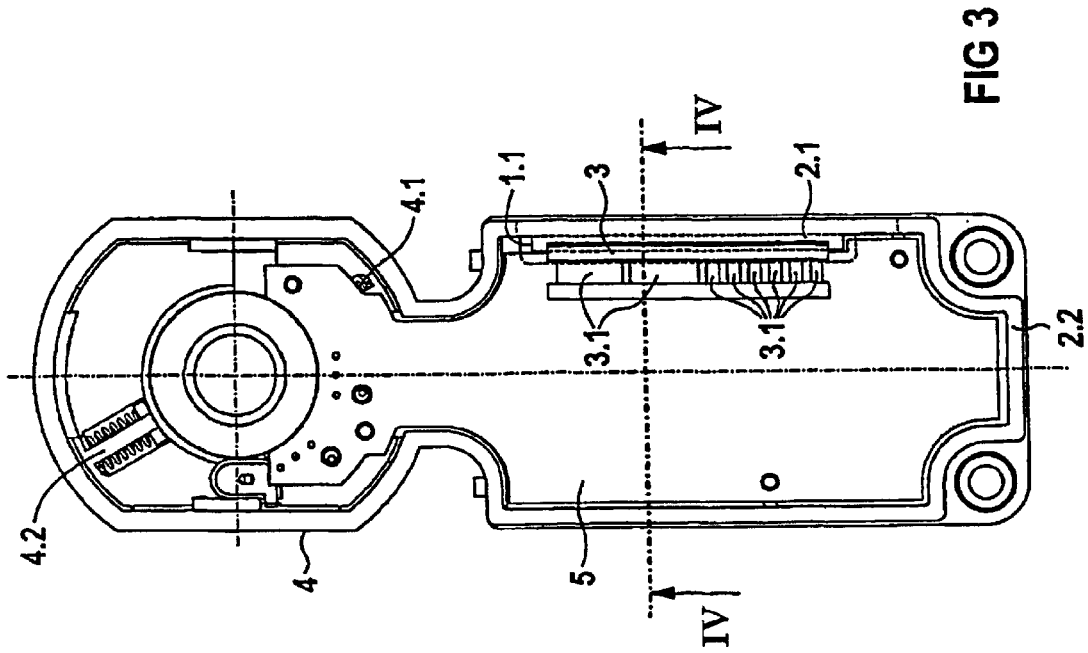
FIG. 3 is a plan view of the electronics housing according to FIGS. 1 and 2.

FIGS. 1 to 4 show a pot-shaped injection-molded polyamide plastic housing 1 for accommodating control electronics mounted on a partially indicated circuit board 5 fixed inside the housing 1. Connected monolithically to the housing 1 is a brush supporting arrangement 4 with brushes 4.1 and 4.2 disposed therein, into the interior of which the circuit board 5 partially extends. In a manner known from U.S. Pat. No. 5,528,093, the entire contents of which are incorporated herein by reference, the brush supporting arrangement is disposed between, on the one hand, the front faces of a motor housing of a commutator motor and, on the other, a transmission housing of a worm transmission such that, in the area of the commutator, the brush supporting arrangement 4 may be externally enclosed by the motor housing and transmission housing. The housing 1 accommodating the control electronic can be tightly sealed by a transmission-side housing cover 6 which can be placed on the top edge of the housing. For leakproof sealing of the overlying components, there is provided a monolithic sealing layer 2.2 of a seal 2, the sealing layer 2.2 being molded onto the housing on the edge side.

For making contact between the control electronics of the circuit board 5 accommodated in the cavity of the housing 1 on the one hand and an external supply connection on the other, conductors 3.1 embedded in a flexible conductor support 3 are used. The conductor 3.1 can be connected to the circuit board 5 using contact points angled towards the contact plane of the circuit board 5 inside the housing and which lead e.g. to a customer-side plug connection (not shown here) using contact points outside the housing.

A separate penetration opening 1.1 provided outside the area or the seating layer 2.2 in the base area of the pot-shaped housing 1 and of a housing side wall in proximity thereto is used for sealed electrical routing of the conductors 3.1 from the inside of the housing 1 to the outside. The flexible conductor support 3 containing the conductors 3.1 embedded therein as a kind of foil conductor is molded in the penetration opening 1.1 with a conductor support seal 2.1 made of a thermoplastic or similar material.

According to one embodiment of the invention, the conductor support 3 containing the embedded, specifically molded-in conductors 3.1 is kept routed inside the housing 1 along the housing side wall near the penetration opening 1.1 by a seal extension 2.3 by molding it on as far as its offsettable contact-making end with the circuit board 5. The conductor support seal 2.1 and the edge-side sealing layer 2.2 as well as, if necessary, the seal extension 2.3 are preferably injection-molded as a one-piece seal 2 in a single operation.

An advantageous method for manufacturing the cable penetration according to the invention is characterized by the following operations:

Fabricating, in particular injection-molding, the housing with the separate penetration opening provided for the conductor support lead-through and possibly the housing opening that can be closed by means of the housing cover by interposing a sealing layer;

Inserting the conductor support through the penetration opening of the housing;

Injection molding the conductor support seal around the conductors and onto the housing in the area of the housing edge of the penetration opening and the sealing layer onto the housing in the area of its housing edge provided for placement of the housing cover.

To summarize: To reduce the material and production costs for a sealed electrical cable penetration through the wall of a housing 1, electrical conductors 3.1 are embedded in a flexible conductor support 3 made of polyester; the conductor support 3 is molded in place by injection molding of a conductor support seal 2 made of a thermoplastic material in a separate penetration opening 1.1 in the wall of the housing 1 made of a polyamide.

What is claimed is:

1. A device for sealing an electric cable penetration through the wall of a housing, comprising:

a housing including electronics arranged therein and having a wall defining a penetration opening therethrough;

a flexible conductor support made of plastic and including electrical conductors embedded therein, the plastic providing insulation of said electrical conductors, wherein said flexible conductor support extends through said penetration opening for electrical connection of at least one of said electrical conductors to said electronics in said housing; and a conductor support seal providing leakproof sealing and mechanical fixing between said penetration opening defined by said housing and said flexible conductor support, said conductor support seal being made from plastic and molded directly onto said flexible conductor support and said housing.

2. The device of claim 1, wherein said conductor support seal is molded around the conductors in said flexible conductor support and onto edges of said housing defining said penetration opening.

3. The device of claim 2, further comprising a housing cover covering said housing and a sealing layer interposed between said housing cover and said housing for providing a sealed connection between said housing cover and said housing, wherein said penetration opening is located outside of an area of said sealing layer.

4. The device of claim 3, further comprising a seal extension molded together with said conductor support seal, wherein said conductor support is held in a fixed position in said housing outside of said penetration opening by said seal extension.

5. The device of claim 4, wherein said seal extension, said conductor support seal and said sealing layer are molded together as one integral piece.

6. The device of claim 3, wherein said conductor support seal and said sealing layer are molded together as one integral piece.

7. The device of claim 2, further comprising a seal extension molded together with said conductor support seal, wherein said conductor support is held in a fixed position in said housing outside of said penetration opening by said seal extension.

8. The device of claim 7, wherein said seal extension and said conductor support seal are molded together as one integral piece.

9. The device of claim 1, further comprising a seal extension molded together with said conductor support seal, wherein said conductor support is held in a fixed position in said housing outside of said penetration opening by said seal extension.

10. The device of claim 9, wherein said seal extension and said conductor support seal are molded together as one integral piece.

11. The device of claim 1, further comprising a housing cover covering said housing and a sealing layer interposed between said housing cover and said housing for providing a sealed connection between said housing cover and said housing, wherein said penetration opening is located outside of an area of said sealing layer.

* * * * *